K. C. RANDALL, S. W. FARNSWORTH & C. LE G. FORTESCUE.
INSULATING BODY FOR ELECTRICAL APPARATUS.
APPLICATION FILED APR. 30, 1910.
1,129,520.
Patented Feb. 23, 1915.
2 SHEETS—SHEET 1.
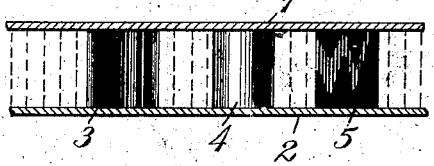
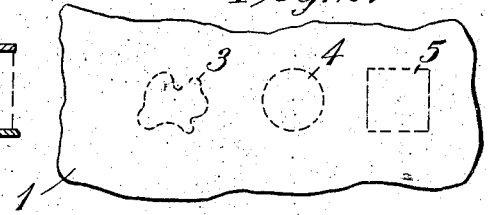
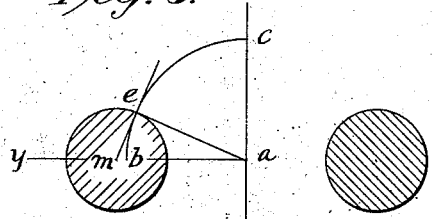
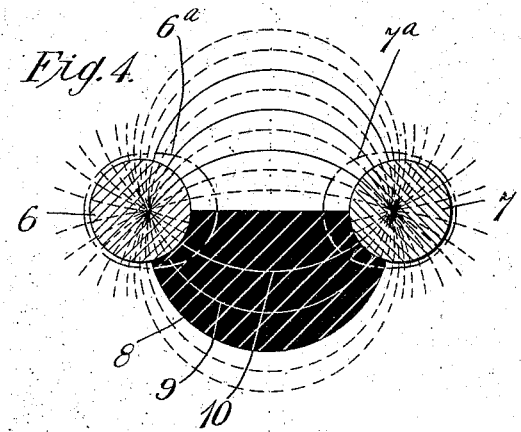
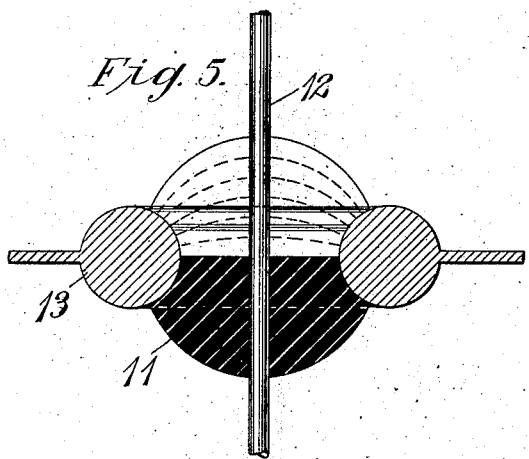
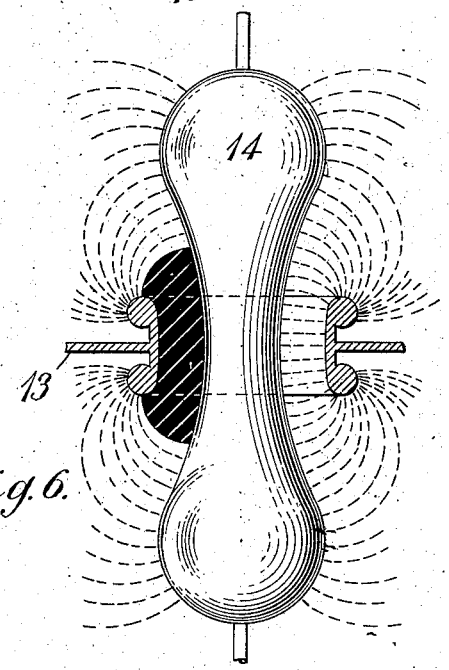

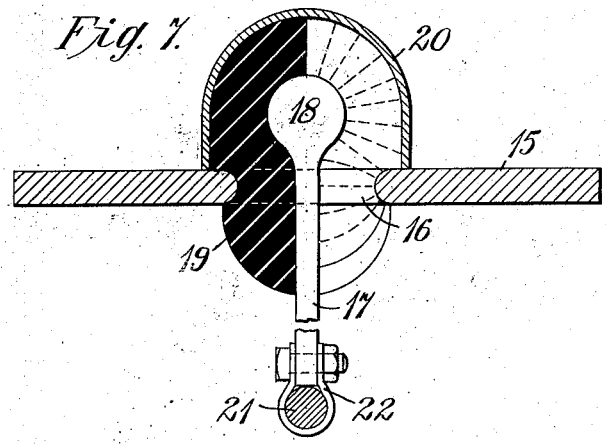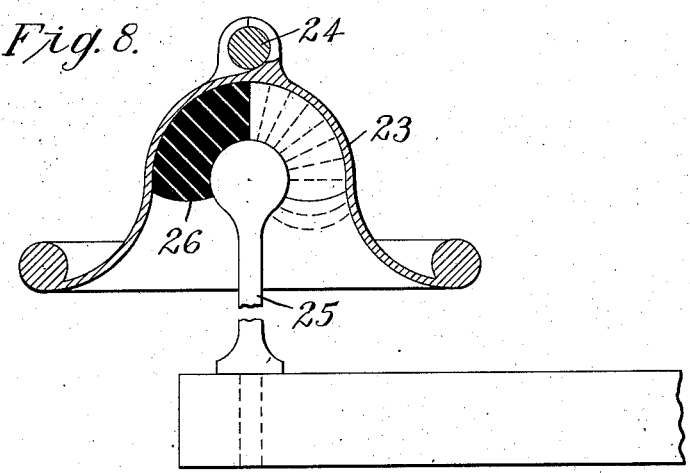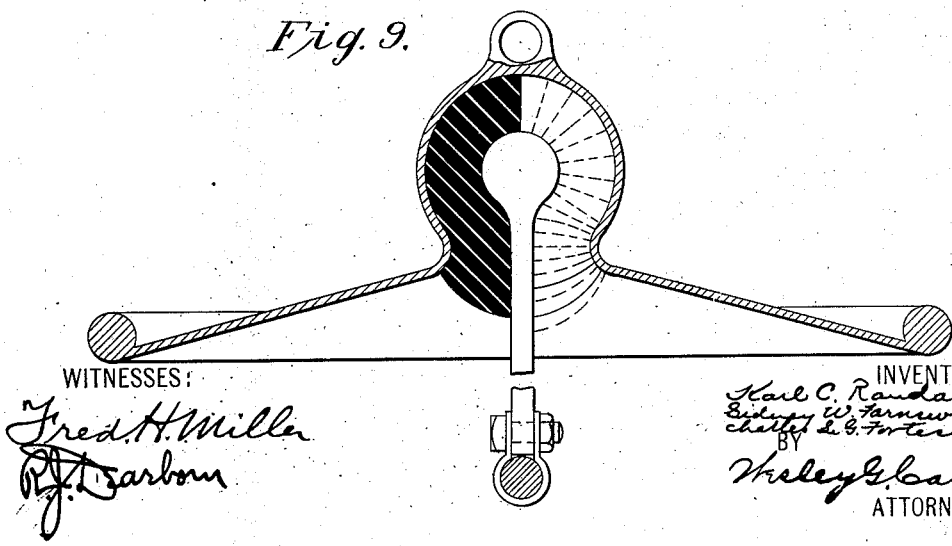

UNITED STATES PATENT OFFICE.

KARL C. RANDALL AND SIDNEY W. FARNSWORTH, OF EDGEWOOD PARK, AND CHARLES LE GEYT FORTESCUE, OF PITTSBURGH, PENNSYLVANIA, ASSIGNORS TO WESTINGHOUSE ELECTRIC AND MANUFACTURING COMPANY, A CORPORATION OF PENNSYLVANIA.

INSULATING-BODY FOR ELECTRICAL APPARATUS.

1,129,520. Specification of Letters Patent. Patented Feb. 23, 1915.

Application filed April 30, 1910. Serial No. 558,744.

*To all whom it may concern:*

Be it known that we, KARL C. RANDALL and SIDNEY W. FARNSWORTH, citizens of the United States, and residents of Edgewood Park, in the county of Allegheny and State of Pennsylvania, and CHARLES LE G. FORTESCUE, a subject of the King of Great Britain, and a resident of Pittsburgh, in the county of Allegheny and State of Pennsylvania, have invented a new and useful Improvement in Insulating-Bodies for Electrical Apparatus, of which the following is a specification.

Our invention relates to insulating bodies or structures for electrical apparatus and particularly to such bodies or structures as are adapted for separating conducting members between which very high differences of potential exist.

One object of our invention is to provide a solid insulating body or structure that is adapted to separate high-voltage conductors and is of such shape as to utilize, to its full insulating value, the air or other insulating medium in which the conductors are located.

A second object of our invention is to materially simplify the form of, and thereby reduce the cost of producing, insulating bodies for high-voltage service.

When a difference of potential exists between adjacent conducting bodies, the air, or other interposed insulating medium, is subjected to stresses by reason of the electric field produced. A field of this character may be represented by means of lines, the distribution and arrangement of which are dependent upon the shapes and sizes of the conducting bodies, the character of the insulating medium and the potential of the bodies. If two conductors are spaced apart in air, or some other homogeneous insulating medium, a predetermined difference of potential may exist between them without a discharge, such condition being dependent upon the shape of the conductors and the insulating properties of the medium. For example; a much greater difference of potential may exist between spherical conductors of large diameter than between needle point conductors and a much greater difference of potential may exist between conductors which are separated by a homogeneous mass of glass or porcelain than may exist between the same conductors in air. The influence of the shape and size may best be understood by considering the influence which these factors exert upon the electric fields produced by electrical energy in the conductor; thus, it is apparent that the insulating medium which is adjacent to a needle point conductor is subjected to much greater stresses, on account of the concentration of the electric field, than the same medium when adjacent to a spherical conductor. The electric field may be influenced, not only by the shape, size and position of the conducting members, but also by introducing an insulating body having a different specific inductive capacity from that of the air. For example, it has been observed that a discharge may be produced between two conductors which are located in air by introducing a porcelain or glass body into the medium between them but without making contact with them. When air alone separates the conductors, the total drop or difference of potential is distributed through it in accordance with the shape of the existing electric field. The introduction of the solid insulator, however, so varies the field as to concentrate a proportionately greater potential stress upon the air which then occupies the space between the conductors and the insulating body. Heretofore, insulating bodies, such as porcelain line insulators, or bushings, have been corrugated, or otherwise so constructed as to provide a very long surface distance between the conductors with which they were intended for use, in order to avoid a surface discharge. A discharge of this kind is due to the concentration of the potential stresses in the air adjacent to the body, and the concentration of stress may result from the incorrect shape of the conducting terminals or from the incorrect form of the insulating body, but usually both factors enter into the resulting stress.

We have discovered that the concentration of stress which may be attributed to the second cause above referred to, may be entirely avoided by making the shape of the insulating body such as to conform to the normal lines of force which would represent the existing electric field between the conducting bodies if they were located in a homogeneous insulating medium, such as air. In order to do this, as hereinafter more fully pointed out, it is necessary to extend the solid insulating body from one conductor to the other and to give it a special surface configuration.

It will be apparent to those skilled in the art that, if the path between conductors, on the surface of the insulating body, is capable of withstanding the full voltage which the same path through air, would withstand when the insulating body is absent, the air is utilized to its full value as an insulator and the insulating body may be materially reduced in size and simplified in outline, thereby materially reducing its cost.

We have discovered that, in order to get the best results and to avoid subjecting certain portions of the air to much greater stress than other portions, the form of the adjacent surfaces of the conductors and their general dimensions, as well as the form and dimensions of the interposed insulating body, should be carefully predetermined. Furthermore, the line of intersection between the surface of each conductor and the insulating body should be a locus of equi-intensity points on the surface of the conductor; i. e., the surface density of the conductor, at any point in the line of intersection, should be equal to that of every other point therein.

It will be evident that our invention is capable of very wide application and, while it is only necessary to illustrate it in a few different relations, we do not wish to be limited to any specific structure or arrangement since we believe that our discovery is broadly new.

Our invention is illustrated in the accompanying drawings in which—

Figures 1 and 2 are, respectively, a sectional elevation and a plan view of portions of two parallel conducting planes separated by several insulating bodies. Fig. 3 is a diagrammatic view illustrating a simple method of constructing a series of lines for the purpose of representing an electric field existing between two cylindrical conductors in a homogeneous insulating medium. Fig. 4 is a diagrammatic view representing an electric field by a series of broken lines constructed by the method of Fig. 3. Fig. 5 is a partially sectional elevation of a substantially cylindrical conducting body projecting through an opening in a conducting plate, the edges of the opening being merged into a torus ring of conducting material and the electric field existing in case one of the conductors is at a different potential from the other being represented by broken lines as in the other figures. Fig. 6 is a view corresponding to Fig. 5, the conductor being specially formed for the purpose of modifying the existing electric field. Figs. 7, 8 and 9 are partially sectional elevations of insulating bodies specially adapted for supporting high-voltage transmission circuit conductors, one-half of the insulating body being shown in cross section in each case, and the electric field existing in the insulating body being represented in the other half by broken lines.

In order to clearly set forth the principles of our invention, we have illustrated it in Figs. 1 and 2 in the simplest possible manner by showing two parallel planes which are assumed to be of infinite size and supported by suitably formed insulating bodies. The electric field existing between two infinite conducting planes is uniform and may be represented by a plurality of uniformly distributed transverse lines at right angles to the planes. The conducting planes may be separated by insulating bodies, without distorting the electric fields existing between them and without increasing the tendency for a discharge to take place between them, provided the surfaces of the insulating bodies are so formed as not to intercept but to conform to the lines which represent the field, for example: In Figs. 1 and 2 the conducting members 1 and 2 may be separated by insulating bodies 3, 4 and 5 which may be circular, square or irregular in cross section, so long as they are prismatic in form and their axes are perpendicular to the planes. The surface density of each plane is uniform and, consequently, need not be considered in this case.

Two parallel conducting cylinders of infinite length may next be considered, as indicated in Fig. 3, since it is possible to approximately determine the electric field which exists between conducting bodies of this shape, when located in a homogeneous insulating medium, although the field is by no means uniform.

It is possible to experimentally determine with considerable accuracy, the lines which correctly represent any symmetrical electric field since it is known that these lines are all perpendicular to the equi-potential surfaces which may be imagined as existing between conducting bodies. In the case under consideration, however, it is possible to geometrically construct the lines representing the field in the following manner: Draw two intersecting lines $ax$ and $ay$ at right angles to each other. With the point of intersection $a$ as a center draw an arc $bc$. Draw any radius, such as $ae$, and at $e$ construct a tangent $em$ to intersect the line $ay$ at $m$. Then, with $m$ as a center and $me$ as a radius, draw a circle. If this circle represents one of two parallel cylinders of infinite length and the other be drawn, with an equal radius, about a center on line $ay$ at an equal distance on the opposite side of the line $ax$; any circular arc drawn with a center on the line $ax$ and passing through the point b will correctly represent a line of force or a flow line, of the electric field existing between the cylinders. Fig. 4 is produced in the manner just described, the surface density of the cylindrical conductor being represented by polar curves 6ª and 7ª.

It is evident that, if the cylindrical bodies 6 and 7 are to be separated by insulating bodies having surfaces which conform to the flow lines (indicated by broken lines in Fig. 4) and which intersect the conducting cylinders in lines which are loci of equi-intensity points on the surfaces of the cylinders, they will assume an approximately circular or an elliptical form in cross section, as bodies 8, 9 and 10 in Fig. 4, and must be infinite in extent. It is, of course, impossible to produce or utilize an insulating body of this form, but it is evident that a simple insulating body could easily be formed to properly separate two conducting spheres without intercepting any of the flow lines which represent the electric field existing between them. It is frequently necessary to bring a conducting lead through a hole or opening in a tank or casing and very expensive bushings have been proposed and used for preventing a discharge between the conductor, which is frequently at a high potential, and the casing or tank, which is usually grounded. The edges of the opening through which the conducting lead extends have ordinarily been comparatively sharp and, consequently, if there is a great difference of potential between the casing and the lead, the electric field produced is of such form as to concentrate the stresses at the edges in the opening and to render it extremely difficult to insulate between the two. According to our present invention, we so modify the edges of the opening in the tank or casing as to produce an electric field in which the stresses are more uniformly distributed and we substitute for the usual lead, a conducting cylinder or tube of relatively large diameter. As shown in Fig. 5, the edges of the opening may be merged into a torus ring of conducting material in order that the electric field may be more readily determined. In this case, an insulating body may be employed which is substantially circular or elliptical in section, in any intersecting plane through the axis of the conducting rod or tube, and substantially circular in section, in any plane perpendicular to the center line of the conducting rod or tube, and, at the same time, not only avoid intercepting any of the lines which represent the existing electric field, but also intersect the surface of the torus ring in equi-intensity lines. For example, the insulating body 11 may serve, not only to separate the conducting rod or tube 12 from the tank or casing 13, through which it extends, but may also support the tube in the usual manner. By employing substantially the form shown in Fig. 5, we are able to very materially reduce the size and the cost of the insulating body, as compared with those usually employed for high-voltage work, since the strength of the path on the surface of the insulating body through the air or other insulating medium, in which the parts are located, is not weakened by the presence of the insulating body and, therefore, it is used, at its maximum efficiency, as an insulator, under the existing terminal conditions.

In the structure shown in Fig. 6, the edges of the opening in the tank 13 are modified and the conducting rod or tube is replaced by a conducting body 14 the surface of which is so shaped as to produce a more uniform or a lower average electric stress at the surface of the insulating solid body which is exposed to the surrounding insulating medium and thereby decrease the size of the insulating body necessarily maintained between the two conducting parts when any predetermined voltage exists between them. In this case, as in those already considered, the insulating body is made to conform to the lines representing the electric field so as to avoid, in every case, intercepting any of the lines; thereby obtaining a maximum insulating efficiency from the air or other insulating medium surrounding the conducting bodies.

Figs. 7, 8 and 9 are intended to represent applications of our invention to commercial line insulators which are adapted for very high-voltage service.

In Fig. 7, 15 represents a portion of a supporting structure having a hole or opening 16 through which a conducting rod 17, having an enlarged end 18, projects. The parts 15 and 17 are separated by an insulating body 19 which is protected from the weather and guarded mechanically by a cap or shield 20 of conducting material. The cap 20 is secured to the support 15 and serves to influence the electric field and thereby to simplify the insulating structure within. A conducting wire 21 may be secured to the lower end of the rod 17 by any suitable means, such as clamps, 22.

In Fig. 8 a somewhat similar structure is shown, except that the cap 20 is replaced by a cap or bell 23 of conducting material to which a conducting wire 24 is secured. The conducting rod 17 is replaced, in this case, by a supporting pin 25 which is enlarged at its upper end and is separated from the bell 23 by an insulating body 26.

Still another application of our invention is shown in Fig. 9, the arrangement in this case being particularly adapted for use as a suspension type insulator.

Our invention is, of course, not restricted to any particular application and we desire that its scope shall be limited only by the appended claims.

We claim as our invention:

1. The combination with two conducting members of unlike electrical potentials, of an interposed insulating body having its surfaces so shaped as to substantially conform to the lines of force representing the electric field existing between the conducting members.

2. The combination with conducting members of different potentials, of an interposed insulating body having its surfaces so shaped as to conform to the lines of force representing the electric field existing between the conductors.

3. An insulating body having its surfaces so shaped as to substantally conform to the lines of force representing the electric field in which it is disposed.

4. The combination with conducting members of unlike electrical potentials having their adjacent surfaces so formed and proportioned as to minimize concentration of stress in any portion or portions of the electric field existing between them, of an interposed insulating body in intimate contact with the adjacent surfaces of the conducting members and having an external surface that substantially conforms to the lines of force representing the electric field between said conducting members.

5. The combination with conducting members of unlike electrical potentials so proportioned as to minimize concentration of stress in any portion or portions of the electric field existing between them, of an interposed insulating body in intimate contact with the adjacent surfaces of the conducting members and having its disengaged surfaces so shaped as to approximately corform to the lines of force representing the aforesaid electric field.

6. The combination with two conducting members of unlike electrical potentials, of an interposed insulating body having its surfaces so shaped as to conform to the lines of force representing the electric field between the conducting members and also so shaped that the line of intersection between the surface of the insulating body and either of the conductors is a locus of points having equal intensity.

7. The combination with conducting members of unlike electrical potentials, of an interposed insulating body in intimate contact with the adjacent surfaces of the conducting members and so formed that the lines of intersection between the surfaces of the insulating body and the conducting members are loci of equi-intensity points on the surfaces of the conducting members.

8. The combination with conducting members of unlike electrical potentials having their sizes proportioned and their adjacent surfaces so formed as to minimize concentration of stress in any portion of the electric field existing between them, of an interposed insulating body in intimate contact with adjacent surfaces of the conducting members and having its surfaces so formed that the lines of intersection between them and the conducting members are loci of equi-intensity points on the surfaces of the conducting members.

9. The combination with conducting members of unlike electrical potentials having their sizes so proportioned and their adjacent surfaces so formed as to minimize concentration of stress in any portion or portions of the electric field existing between them, of an interposed insulating body in intimate contact with the adjacent surfaces of the conducting members and having its surfaces so formed as to approximately conform to the lines of force representing the aforesaid electric field and so that the lines of intersection between it and the conducting members are loci of equi-intensity points on the surfaces of the conducting members.

10. The combination with conducting members of different potentials, of an interposed body having its surfaces so shaped as to conform to the lines of force representing the electric field existing between said conducting members.

11. The combination with a plate or wall of conducting material having an orifice therein, and a terminal member of hour-glass shape extending therethrough and differing in potential from the plate or wall, of an interposed insulating body for supporting the terminal member, said body being shaped to conform substantially to the electric field existing between the conducting members.

12. The combination with a plate or wall of conducting material having an orifice therein, and a terminal member of hour-glass shape extending therethrough and differing in potential from the plate or wall, of an interposed insulating body for supporting the terminal member, said body being shaped to conform substantially to the electric field existing between the conducting members, and said plate or wall being enlarged to provide a flange at the orifice having its surface curved to correspond to the adjacent surface of the terminal member.

13. The combination with a conductor, an insulating bushing surrounding the conductor, and a conducting member surrounding the bushing intermediate its ends, of a conducting body extending transversely of, and connected to the conductor and shaped so as to produce a substantially uniform distribution of electrostatic stress upon the surface of the bushing.

14. The combination with a conductor, an insulating bushing surrounding the conductor, and a conducting member surrounding the bushing intermediate its ends, of a conducting body at one end of the bushing having a convexly curved surface exposed to the electrostatic field existing between it and said conducting member.

15. The combination with a conductor, an insulating bushing surrounding the conductor, and a conducting member surrounding the bushing intermediate its ends, of a conducting body upon the said conductor external to the said bushing having a convexly curved surface exposed to the electrostatic field existing between it and the said member.

16. The combination with a conductor, an insulating bushing surrounding the conductor, and a conducting member surrounding the bushing intermediate its ends, of a conducting body extending transversely of the conductor at one end of the bushing and shaped so as to produce a substantially uniform distribution of electrostatic stress upon the surface of the bushing.

17. A structure comprising two conducting members and an interposed insulating member, the exposed surfaces of said conducting members being expanded and so shaped relatively to each other and to the exposed surfaces of the insulating member as to produce a substantially uniform distribution of electrostatic stress upon said exposed surfaces of the insulating member.

In testimony whereof, we have hereunto subscribed our names this 19th day of April, 1910.

KARL C. RANDALL.
SIDNEY W. FARNSWORTH.
CHARLES LE GEYT FORTESCUE

Witnesses:
C. S. LAWSON,
B. B. HINES.